United States Patent
Chung

(10) Patent No.: US 8,644,387 B2
(45) Date of Patent: Feb. 4, 2014

(54) MOTION ESTIMATION METHOD

(75) Inventor: Chia-Hao Chung, Taoyuan (TW)

(73) Assignee: Mstar Semiconductor, Inc., Hsinchu (TW)

( * ) Notice: Subject to any disclaimer, the term of this patent is extended or adjusted under 35 U.S.C. 154(b) by 1460 days.

(21) Appl. No.: 12/061,938

(22) Filed: Apr. 3, 2008

(65) Prior Publication Data

US 2008/0246884 A1  Oct. 9, 2008

Related U.S. Application Data

(60) Provisional application No. 60/909,945, filed on Apr. 4, 2007.

(51) Int. Cl.
*H04N 11/02* (2006.01)
*H04N 7/50* (2006.01)

(52) U.S. Cl.
CPC ....................................... *H04N 7/50* (2013.01)
USPC .................................................... 375/240.16

(58) Field of Classification Search
USPC .................................................... 375/240.16
See application file for complete search history.

(56) References Cited

U.S. PATENT DOCUMENTS

| | | | |
|---|---|---|---|
| 5,682,205 A * | 10/1997 | Sezan et al. ................... | 348/452 |
| 7,327,788 B2 | 2/2008 | Kadono et al. | |
| 7,362,807 B2 | 4/2008 | Kondo et al. | |
| 7,394,853 B2 | 7/2008 | Kondo et al. | |
| 7,405,765 B2 | 7/2008 | Chao | |
| 7,447,355 B2 | 11/2008 | Wang et al. | |
| 2006/0197774 A1 | 9/2006 | Wang et al. | |
| 2006/0215058 A1* | 9/2006 | Lu et al. ........................ | 348/452 |
| 2008/0232473 A1* | 9/2008 | Marquant et al. ......... | 375/240.16 |

* cited by examiner

*Primary Examiner* — Jason Mattis
*Assistant Examiner* — Stephen J Clawson
(74) *Attorney, Agent, or Firm* — Evan R. Witt; Kirton McConkie

(57) ABSTRACT

For de-interlacing a current interlaced field using a prior interlaced field and a subsequent interlaced field, a motion estimation method is performed with a group of motion-vector sets. Each motion-vector set includes at least two motion vectors. According to the two motion vectors and a specified block of the current interlaced field, which contains a missing pixel to be estimated, a pair of candidate blocks are defined in the prior and subsequent interlaced fields, respectively. By comparing a plurality of pairs of candidate blocks with the specified block, the best matching block pair can be found and used for de-interlacing.

27 Claims, 7 Drawing Sheets

MOTION ESTIMATION METHOD

CROSS-REFERENCE TO RELATED PATENT APPLICATION

This patent application claims the benefit of U.S. provisional patent application No. 60/909,945 filed Apr. 4, 2007.

FIELD OF THE INVENTION

The present invention relates to a motion estimation method, and more particularly to a motion estimation method for use in a de-interlacing process.

BACKGROUND OF THE INVENTION

Interlaced and non-interlaced (or progressive) image formats are two general image formats, and need to be processed by a variety of image systems when transmitted among those image systems. An interlaced image can be converted into a non-interlaced image by a de-interlacing operation. For example, referring to FIG. 1A, by estimating respective missing scan lines (as indicated by dashed lines) of an odd-field interlaced image field 11 and an even-field interlaced image field 12 through a de-interlacing operation 13, two non-interlaced image frames 14 and 15 with a full number of scan lines can be obtained.

The de-interlacing operation 13 can be implemented by way of interpolation. More specifically, a pixel value of a missing pixel can be estimated by way of interpolation according to pixel values of adjacent pixels in upper and lower existing lines, which is referred to as a line-averaging method. Such a de-interlacing method, however, is likely to cause image distortion and/or flicker problems. For solving these problems, block-based motion estimation conventionally used for video compression is applied for de-interlacing. Since two continuously displayed image fields are generally highly correlated to each other, the block-based motion estimation is performed based on adjacent fields.

A scheme of block-based motion estimation is depicted in FIG. 1B. In the block-based motion estimation method, a block 18 with a preset size, for example 8*8 pixels, is specified in the current field (n) with a pixel to be estimated centering thereon. On the other hand, a plurality of candidate blocks within a search window 17 are located according to information of the specified block 18 and a plurality of preset vectors, respectively. For each pair of pixels at corresponding positions of the specified block 18 in the current field (n) and each of the candidate blocks of the preceding field (n−1), a difference in pixel values such as RGB values is calculated. Then absolute values of all the pixel difference values of each candidate block are summed to determine a block difference value. By comparing the block difference values of the candidate blocks, the one having the smallest block difference value from the specified block 18 can be determined as a best matching block 19. Meanwhile, the motion vector 16 indicating the best matching block 19 is an optimal motion vector.

When applying the block-based motion estimation to a de-interlacing process, wherein the fields (n−1) and (n) are of opposite parity fields, a problem that there are no simultaneously existing pixels at corresponding positions of the specified block and the candidate blocks is encountered. Therefore, a variety of methods for calculating block difference values have been developed to determine the best matching block and motion vector.

Please refer to FIG. 2A, wherein column pixels of two continuous interlaced fields of opposite parity fields at corresponding positions are shown side by side in the plot. The same references (y−3)~(y+3) represent pixels at the same positions of the two interlaced fields (n) and (n−1), wherein pixels (y−3)~(y+3) are a series of adjacent pixels in the same column. In the column of the interlaced field (n), solid circles represent existing pixels while dashed triangles represent missing pixels; and in the column of the preceding interlaced field (n−1), solid circles represent existing pixels while dotted circles represent missing pixels. The missing pixels in the field (n−1) represented by the dotted circles have been de-interlaced previously in a similar motion-estimation way. Based on currently available color values, block-based motion estimation is performed as described above with reference to FIG. 1B. For example, for estimating the pixel (n,y) of the interlaced field (n), a specified block containing and centered on the pixel (n,y) and a plurality of candidate blocks in the preceding interlaced field (n−1) are defined. Then respective block difference values between the specified block and the candidate blocks are calculated. Among them, the smallest block difference value is determined, and the best matching block is thus the candidate block having the smallest difference value. Accordingly, the optimal motion vector, e.g. the vector $C_P$, can be obtained.

Since the pixel (n,y) is actually missing in the interlaced field (n), its own pixel difference value cannot be calculated. Instead, pixel values of existing pixels in the specified block are used for calculating the block difference values along with pixel values of the corresponding pixels in the candidate blocks. The corresponding pixels, however, are actually missing but previously de-interlaced. Therefore, the block-based motion estimation is based on estimated data, which if not well de-interlaced, would result in error propagation and even image distortion.

FIG. 2B illustrates another method for searching a best matching block and determining an optimal motion vector. As a matter of fact, a best matching pair of blocks, instead of a best matching block, are searched in this prior art. Column pixels of three continuous interlaced fields (n−1), (n) and (n+1) at corresponding positions are shown side by side in the plot. In this prior art, interfaced fields (n−1) and (n+1) of the same field are used for obtaining the estimated motion values and motion vectors of the target interlaced field (n). A plurality of pairs of candidate blocks are respectively searched from the interfaced fields (n−1) and (n+1), wherein each pair of candidate blocks have respective center pixels aligned with the pixel (n,y) in the same line. Then respective block difference values between the pairs of candidate blocks are calculated. Among them, the smallest block difference value is determined, and the best matching pair of blocks is thus the pair of candidate blocks having the smallest difference value. Accordingly, the optimal motion vector, e.g. the vector $C_B$, can be obtained. In this prior art, the missing pixel values of the interlaced field (n) are determined according to the pixel values of adjacent fields (n−1) and (n+1) while involving no existing pixel values of the interlaced field (n) itself. Therefore, errors are likely to occur particularly when the pixel to be estimated does not exist in the neighbor fields (n−1) and (n+1).

SUMMARY OF THE INVENTION

Therefore, the present invention provides a motion estimation method for use in a de-interlacing process with improved precision.

The present invention provides a motion estimation method for use in a de-interlacing process of a current interlaced field. The method includes steps of defining a specified block in the current interlaced field, wherein the specified block contains a missing pixel to be estimated and at least one existing pixel; pre-estimating missing pixels of a prior interlaced field and a subsequent interlaced field; defining a first candidate block in the prior interlaced field with pre-estimated pixel values and defining a second candidate block in the subsequent interlaced field with pre-estimated pixel values, wherein a position of the first candidate block in the prior interlaced field and a position of the second candidate block in the subsequent interlaced field are determined according to a position of the specified block in the current interlaced field and a motion-vector set; calculating a first block difference value between the at least one existing pixel of the specified block and at least one corresponding pixel of the first candidate block with pre-estimated pixel values or at least one corresponding pixel of the second candidate block with pre-estimated pixel values; calculating a second block difference value between the at least one corresponding pixel of the first candidate block with pre-estimated pixel values and the at least one corresponding pixel of the second candidate block with pre-estimated pixel values; and calculating a motion estimation value corresponding to the motion-vector set according to the first block difference value and the second block difference value.

The present invention also provides a motion estimation method for use in a de-interlacing process, which includes: receiving a first interlaced field, a second interlaced field and a third interlaced field in sequence; calculating and filling estimated pixel values of missing pixels of the first and third interlaced fields; defining a specified block in the second interlaced field which consists of a plurality of existing pixels; selecting a motion-vector set from a group of predetermined motion-vector sets; defining a first candidate block in the first interlaced field at a position relative to that of specified block in the second interlaced field according to the selected motion-vector set; defining a second candidate block in the third interlaced field at a position relative to that of the specified block in the second interlaced field according to the selected motion-vector set; generating a first block difference value by comparing pixel values of the first candidate block with pixel values of the specified block; generating a second block difference value by comparing pixel values of the second candidate block with pixel values of the specified block; generating a third block difference value by comparing pixel values of the first candidate block with the pixel values of second candidate block; and determining whether the selected motion-vector set is an optimal motion-vector set according to the first, second and third block difference values.

The present invention further provides a motion estimation method for use in a de-interlacing process, which includes: receiving a first interlaced field, a second interlaced field and a third interlaced field of a video signal; defining a specified block in the second interlaced field; defining a plurality of pairs of first and second candidate blocks in the first and third interlaced fields, respectively, according to the specified block and a plurality of motion vector sets; calculating a plurality of first block difference values between the specified block and the first candidate blocks; calculating a plurality of second block difference values between the specified block and the second candidate blocks; calculating a plurality of third block difference values between the pairs of first and second candidate blocks; determining a provisionally optimal motion vector according to the first, second and third block difference values; comparing one of the first block difference values, one of the second block difference values and one of the third block difference values, which correspond to the provisionally optimal motion vector, with a first threshold and a second threshold lower than the first threshold; and determining whether the provisionally optimal motion vector set includes an optimal motion vector or not according to the comparing result.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

For improving accuracy of motion estimation, the present invention provides a multi-directional motion estimation method. In an embodiment of the present invention, a set of three motion vectors are used for defining a candidate block. Please refer to FIGS. 3A, 3B and 3C, in which three consecutive interlaced fields 31, 32 and 33 are shown. The fields 31 and 33 are of the same parity field, while the field is of an opposite parity field. In other words, if the fields 31 and 33 are of an even field, the field 32 is of an odd field; or the fields 31 and 33 are of an odd field, and the field 32 is of an even field.

Figure 1A:
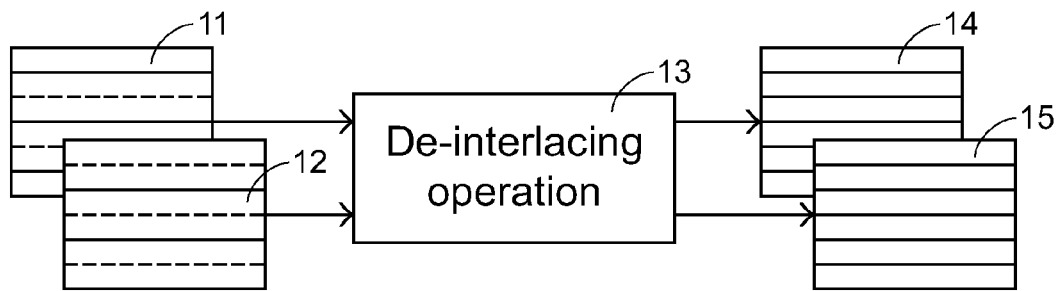
FIG. 1A is scheme showing an de-interlacing operation.
Figure 1B:
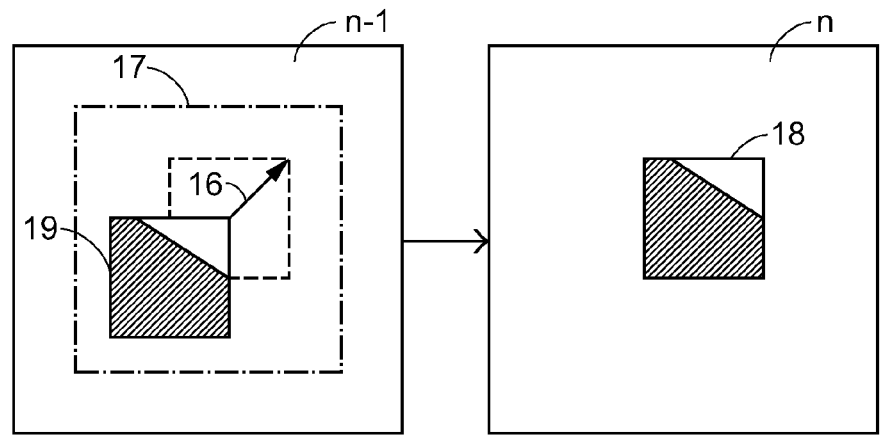
FIG. 1B is a scheme showing a typical block-based motion estimation method.
Figure 2A:
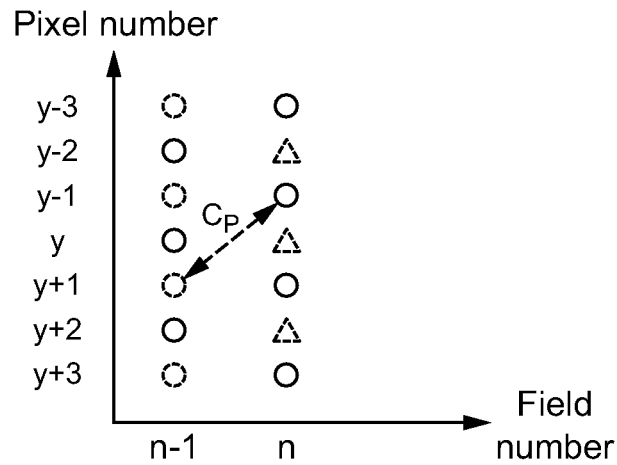
FIG. 2A is a plot schematically showing associated pixels used in a conventional block-based motion estimation method.
Figure 2B:
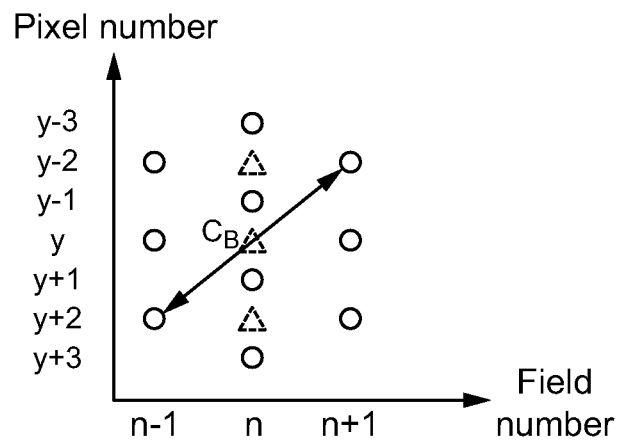
FIG. 2B is a plot schematically showing associated pixels used in another conventional block-based motion estimation method.
Figure 3A:
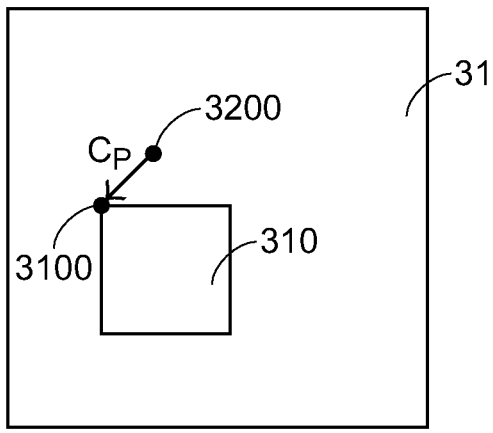
FIGS. 3A~3C are schematic diagrams showing three consecutive interlaced fields involved in a motion estimation method according to an embodiment of the present invention.
Figure 3B:
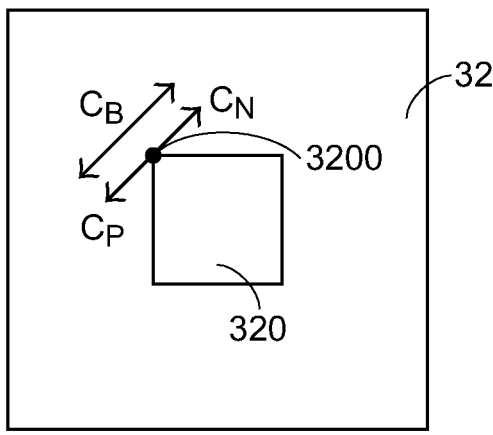

First of all, a block 320 with a preset size is specified in the current field 32 of FIG. 3B. The block 320 consists of a plurality of existing pixels and a plurality of missing pixels, which are indicated by circles and triangles in FIG. 4B, respectively. For example, when the field 32 is an interlaced field with an 800*600 pixel size, it actually includes 800*300 pixels. In this case, it is proper that the specified block 320 has a block size of 4*4, 8*8 or 16*16 pixels, wherein only 4*2, 8*4 or 16*8 pixels are actually existent and the others are missing pixels to be estimated.

On the other hand, the preceding and next interlaced fields 31 and 33 also have substantially a half of pixels missing, so interpolation is performed to estimate pixel values of the missing pixels. The interpolation in this embodiment is additionally performed by way of line averaging, i.e. estimating a pixel value of a missing pixel according to pixel values of adjacent pixels in upper and lower existing lines.

Figure 3C:
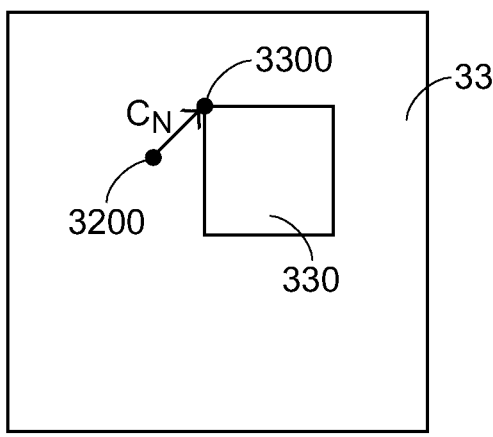

Furthermore, a plurality of sets of three motion vectors ($C_P$, $C_B$ and $C_N$) are provided, wherein $C_P$ and $C_N$ are in opposite directions and starts from an existing pixel of the field 32, while $C_B$ is parallel to $C_P$ and $C_N$ and starts from an existing pixel of the field 31 or an existing pixel of the field 33. Based on a relative position of the block 320 in the field 32, for example represented by a left upper corner pixel and indicated by a coordinate 3200, and one of the sets of motion vectors, a candidate block 310 is defined in the field 31, as shown in FIG. 3A, and a candidate block 330 is defined in the field 33, as shown in FIG. 3C. The motion vector $C_P$ points from the coordinate 3200 in the field 32 to a coordinate 3100 in the preceding field 31, thereby defining the candidate block 310. Likewise, the motion vector $C_N$ points from the coordinate 3200 in the field 32 to a coordinate 3300 in the preceding field 33, thereby defining the candidate block 330.

Figure 5:
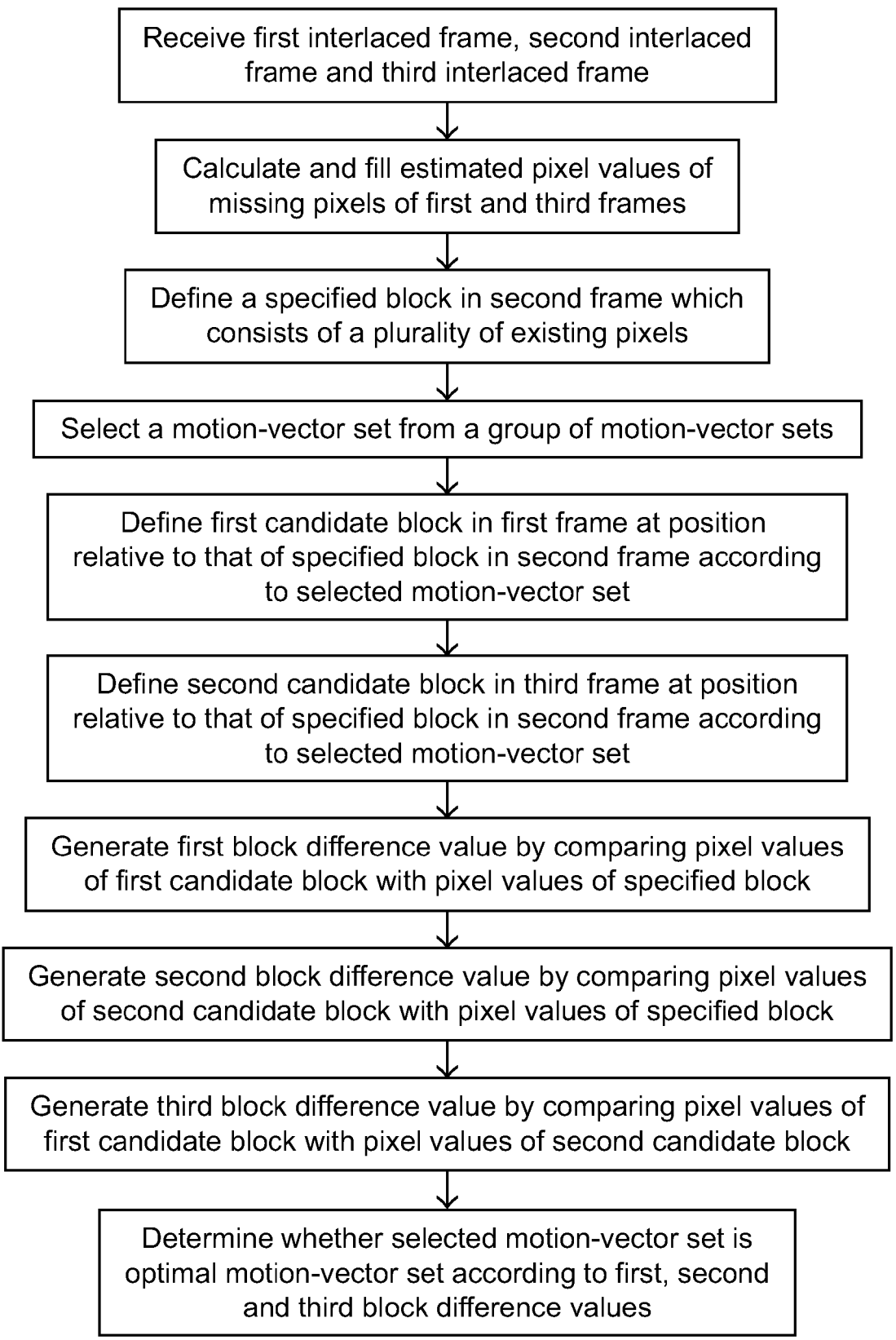
FIG. 5 is a flowchart briefly summarizing a motion estimation method according to an embodiment of the present invention.

In response to the vector $C_P$, a first block difference value is calculated by summing absolute values of the pixel difference values between existing pixels of the field 32 and corresponding pixels of the field 31. The corresponding pixels of the field 31 could be existing pixels or missing pixels with estimated pixel values, depending on the vector $C_P$. Likewise, in response to the vector $C_N$, a second block difference value is calculated by summing absolute values of the pixel difference values between existing pixels of the field 32 and corresponding pixels of the field 33. The corresponding pixels of the field 33 could be existing pixels or missing pixels with estimated pixel values, depending on the vector $C_N$. Furthermore, in response to the vector $C_B$, a third block difference value is calculated by summing absolute values of the pixel difference values between existing pixels of the field 31 and corresponding existing pixels of the field 33. The first, second and third block difference values are then summed to obtain a motion estimation value corresponding to the set of three motion vectors. In a similar manner, other motion estimation values respectively corresponding to other sets of motion vectors are calculated and compared to one another. Among them, the smallest motion estimation value is determined, and the best matching pair of blocks is thus the candidate block pair resulting in the smallest difference value, e.g. blocks 310 and 330. Accordingly, the optimal set of motion vectors $C_P$, $C_B$ and $C_N$ can be obtained. A flowchart of FIG. 5 summarizes the principal concept of the above motion estimation method.

The term "corresponding pixels" used above indicates the pixels at the same relative positions in different blocks of the same size. Any other type of correspondence can also be applied as long as the corresponding pixels are highly correlated in desired properties such as color values. In the above embodiment, all existing pixels in the specified block 320 and corresponding pixels in the candidate blocks are used for calculating the block difference values. Alternatively, it is also feasible to use one or more selected pixels only to calculate the block difference values. In addition, a set of two motion vectors can be used in lieu of the set of three motion vectors in order to simplify the calculation. The number of sets of motion vectors is also adjustable depending on practical requirements.

Figure 4A:
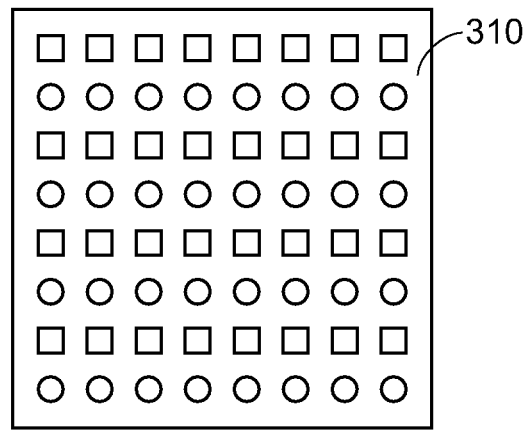
FIGS. 4A~4C are schematic diagrams showing distributions of existing and missing pixels in three associated blocks involved in a motion estimation method according to an embodiment of the present invention.
Figure 4B:
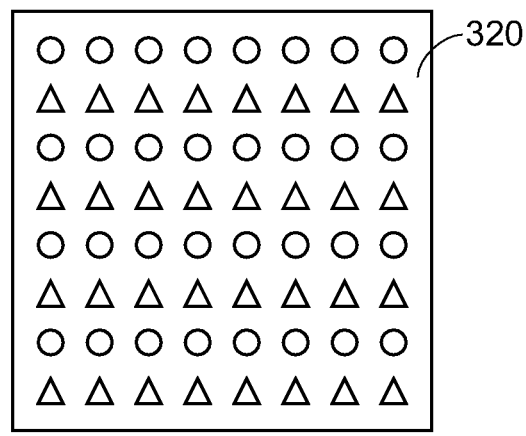
Figure 4C:
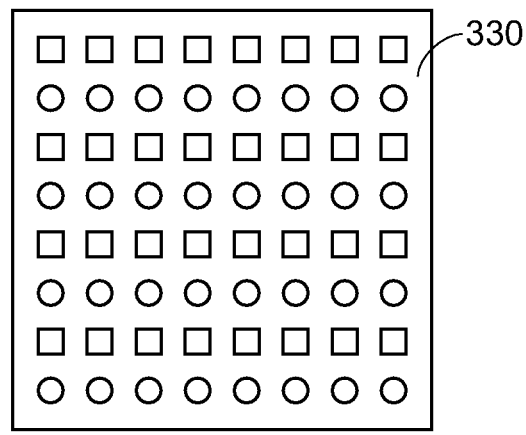

FIGS. 4A, 4B and 4C exemplify the specified block 320 and candidate blocks 310 and 330, respectively. In this example, each of the blocks has an 8*8 pixel size. The circles in each of the blocks indicate existing pixels while triangles and rectangles indicate missing pixels to be estimated. In other words, as shown, the odd lines of the candidate blocks 310 and 330 and the even lines of the specified block 320 are missing pixels. Alternatively, varying with the motion vectors, i.e. change of coordinate 3100 and/or 3300, it is possible that the odd lines of the candidate blocks 310 and 330 are existing pixels while the even lines are missing pixels. Basically, the blocks 310 and 330 change simultaneously. On the other hand, the even lines of the specified block 320 can be existing pixels while the odd lines can be missing pixels once the specified block (or coordinate 3200) changes.

Although an interlaced field can be precisely de-interlaced by finding an optimal motion vector set as mentioned above, the de-interlacing operation can be further improved in some special cases. For example, in an embodiment of the present invention, three consecutive interlaced fields of a video signal are involved for estimating pixel values of missing pixels of a current interlaced field. However, if the video signal includes a motion object that appears in the first interlaced field and the second interlaced field but disappears from the third interlaced field, or the motion object is not present in the first interlaced field but appears in the second and third interlaced fields, the motion estimation involving all the three interlaced fields would become impractical enough.

Figure 6:
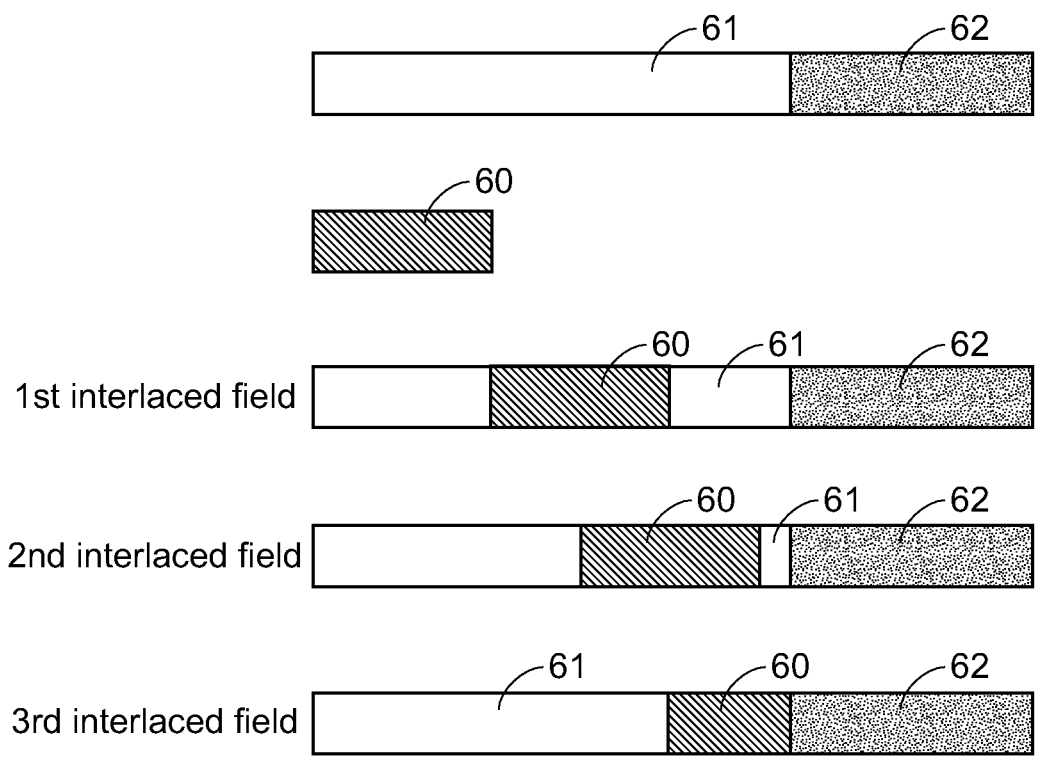
FIG. 6 is a scheme illustrating a case in which error may happen due to a totally or partially hidden object.

FIG. 6 illustrates another case in which errors may happen. As shown, a motion object 60 moves relative to a background 61, and thus exists at different positions of the first interlaced field and the second interlaced field but is partially hidden from a static object 62 in the third interlaced field. Under this circumstance, the optimal motion vector set determined according to the above-mentioned motion estimation method is used as a provisionally optimal motion vector set which requires modification. Since the motion object 60 is only partially shown in the third interlaced field, the first block difference value calculated in response to the vector $C_P$ by summing absolute values of the pixel difference values between existing pixels of the second interlaced field and corresponding pixels of the first interlaced field is much smaller than the second block difference value calculated in response to the vector $C_N$ by summing absolute values of the pixel difference values between existing pixels of the second interlaced field and corresponding pixels of the third interlaced field and the third block difference value calculated in response to the vector $C_B$ by summing absolute values of the pixel difference values between existing pixels of the first interlaced field and corresponding existing pixels of the third interlaced field. In a further embodiment of the present invention, for alleviating the adverse effect of the second and third block difference values, the first block difference value is solely used as the motion estimation value, and an optimal motion vector $C_P$ can be determined by acquiring and comparing a plurality of motion estimation values corresponding to a variety of preset motion vectors $C_P$. The motion vector resulting in the smallest motion estimation value is determined as the optimal motion vector $C_P$.

In contrast, if the motion object 60 does not exist in the first interlaced field but exists at different positions of the second interlaced field and the third interlaced field, the second block difference value will be much smaller than the first block difference value and the third block difference value. Therefore, it is preferred that the second block difference value is solely used as the motion estimation value, and an optimal motion vector $C_B$ can be determined by acquiring and comparing a plurality of motion estimation values corresponding to a variety of preset motion vector $C_B$. The motion vector resulting in the smallest motion estimation value is determined as the optimal motion vector $C_B$.

Figure 7:
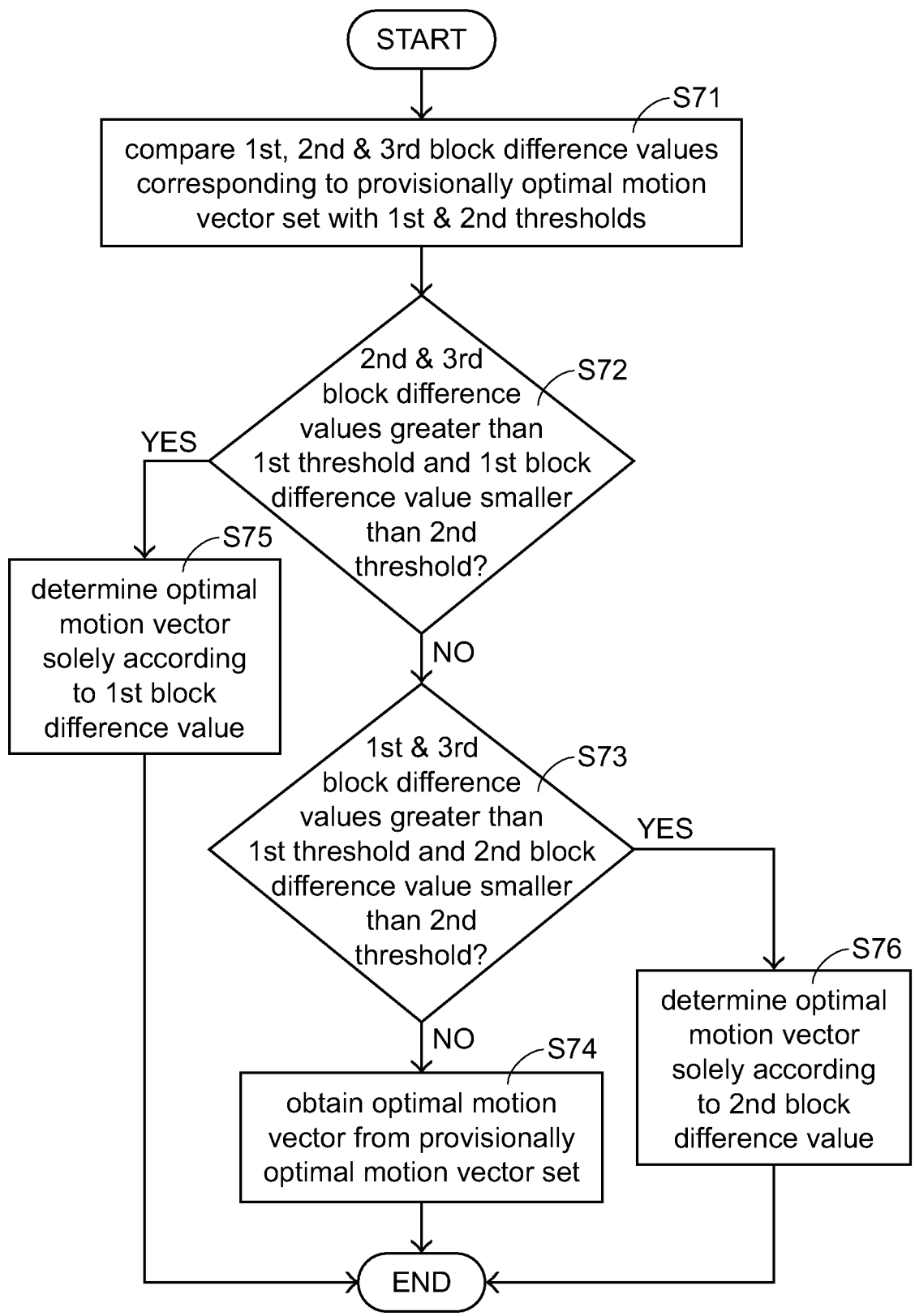
FIG. 7 is a flowchart summarizing a motion estimation method according to another embodiment of the present invention.

A flowchart of FIG. 7 summarizes the modified motion estimation method. First of all, the first, second and third block difference values corresponding to the provisionally optimal motion vector set are compared with a first threshold and a second threshold that is lower than the first threshold (Step S71). If the second and third block difference values are greater than the first threshold and the first block difference value is smaller than the second threshold (Step S72), an optimal motion vector is determined solely according to the first block difference value (Step S75). Otherwise, check if the first and third block difference values are greater than the first threshold and the second block difference value is smaller than the second threshold (Step S73). If positive, determine an optimal motion vector solely according to the second block difference value (Step S74). Otherwise, confirm the provisionally optimal motion vector set to be the optimal motion vector set, and obtain an optimal motion vector for subsequent operations from the optimal motion vector set.

To sum up, the motion estimation method according to the present invention is particularly designed to find the best matching block or block pair. By changing the sizes and/or directions of the predetermined motion-vector sets to define a plurality of candidate blocks, a plurality of block difference values can be obtained. One of the plurality of block difference values, e.g. the smallest one, is selected, and the motion-vector set corresponding to the selected block difference value is then determined as the optimal motion vector set. Since the current field and the preceding and next fields are all referred to when determining the optimal motion vector set, the de-interlacing process can be performed with improved precision. Furthermore, by using the spatial line-averaging method, instead of temporally de-interlacing method, to estimate the missing pixels of the preceding and next fields, error propagation can be avoided. Furthermore, by setting thresholds for the block difference values to modify the motion estimation method, the de-interlacing effect for special cases can be further improved.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A motion estimation method for use in a de-interlacing process of a current interlaced field, comprising:
   defining a specified block in the current interlaced field, wherein the specified block contains at least one missing pixel and at least one existing pixel;
   pre-estimating missing pixels of a prior interlaced field and a subsequent interlaced field;
   defining a first candidate block in the prior interlaced field with pre-estimated pixel values and defining a second candidate block in the subsequent interlaced field with pre-estimated pixel values, wherein a position of the first candidate block in the prior interlaced field and a position of the second candidate block in the subsequent interlaced field are determined according to a position of the specified block in the current interlaced field and a motion-vector set;
   calculating a first block difference value, which is a first difference between the at least one existing pixel of the specified block and at least one corresponding pixel of the first candidate block with pre-estimated pixel values, wherein the first difference is not between any one missing pixel of the specified block and a corresponding pixel of the first candidate block with pre-estimated pixel values;
   calculating a second block difference value, which is a second difference between at least one existing pixel of the first candidate block and at least one corresponding existing pixel of the second candidate block, wherein the second difference is not between any one missing pixel of the first candidate block and a corresponding missing pixel of the second candidate block; and
   calculating a motion estimation value corresponding to the motion-vector set according to the first block difference value and the second block difference value.

2. The motion estimation method according to claim 1 wherein the missing pixel is centered in the specified block.

3. The motion estimation method according to claim 1 wherein the prior interlaced field and the subsequent interlaced field are of the same parity field which is opposite to a parity field of the current interlaced field.

4. The motion estimation method according to claim 1 wherein pixel values of the missing pixels of the prior interlaced field and subsequent interlaced field are pre-estimated by interpolation with pixel values of adjacent pixels in upper and lower existing lines.

5. The motion estimation method according to claim 1 wherein the first candidate block and second candidate block have the same pixel size as the specified block.

6. The motion estimation method according to claim 1 wherein the motion-vector set comprises a first motion vector pointing from a coordinate of the specified block to a first specified coordinate where the first candidate block is defined, and a second motion vector being in parallel to the first motion vector and pointing from the first specified coordinate of the first candidate block to a second specified coordinate where the second candidate block is defined.

7. The motion estimation method according to claim 6 wherein the motion-vector set further comprises a third motion vector opposite to the first motion vector and pointing from the coordinate of the specified block to the second specified coordinate of the second candidate block.

8. The motion estimation method according to claim 7 further comprising calculating a third block difference value, which is a third difference between the at least one existing pixel of the specified block and the at least one corresponding pixel of the second candidate block with pre-estimated pixel values wherein the third difference is not between any one missing pixel of the specified block and a corresponding pixel of the second candidate block with pre-estimated pixel values, wherein the motion estimation value corresponding to the motion-vector set is calculated by summing the first block difference value, the second block difference value and the third block difference value.

9. The motion estimation method according to claim 1 wherein the at least one corresponding pixel of the prior or subsequent interlaced field to be compared with the at least one existing pixel for calculating the first block difference value is a missing pixel with a pre-estimated pixel value or an existing pixel in the prior or subsequent interlaced field, depending on the motion-vector set.

10. The motion estimation method according to claim 1 further comprising:
    providing other motion-vector sets with sizes and/or directions different from those of the motion-vector set;
    redefining the first candidate block and the second candidate block according to each of the motion-vector sets; and
    recalculating the first block difference value, the second block difference value and the motion estimation value according to the specified block, the redefined first candidate block and the redefined second candidate block.

11. The motion estimation method according to claim 10 further comprising:

comparing the resulting motion estimation values to select an optimal motion estimation value; and defining one of the motion-vector sets, which results in the optimal motion estimation value, as an optimal motion-vector set.

12. The motion estimation method according to claim 11 wherein the optimal motion estimation value is the smallest one of the resulting motion estimation values.

13. A motion estimation method for use in a de-interlacing process, comprising:

receiving a first interlaced field, a second interlaced field and a third interlaced field in sequence;

calculating and filling estimated pixel values of missing pixels of the first and third interlaced fields;

defining a specified block in the second interlaced field which comprises a plurality of existing pixels;

selecting a motion-vector set from a group of predetermined motion-vector sets;

defining a first candidate block in the first interlaced field at a position relative to that of the specified block in the second interlaced field according to the selected motion-vector set;

defining a second candidate block in the third interlaced field at a position relative to that of the specified block in the second interlaced field according to the selected motion-vector set;

generating a first block difference value by comparing pixel values of corresponding pixels of the first candidate block with pixel values of the existing pixels of the specified block;

generating a second block difference value by comparing pixel values of corresponding pixels of the second candidate block with pixel values of the existing pixels of the specified block;

generating a third block difference value by comparing pixel values of existing pixels of the first candidate block with the pixel values of corresponding existing pixels of second candidate block; and determining whether the selected motion-vector set is an optimal motion-vector set according to the first, second and third block difference values.

14. The motion estimation method according to claim 13 wherein the first interlaced field and the third interlaced field are of the same parity field which is opposite to a parity field of the second interlaced field.

15. The motion estimation method according to claim 13 wherein the estimated pixel values of missing pixels of the first and third interlaced fields are calculated by interpolation with pixel values of adjacent pixels in upper and lower existing lines.

16. The motion estimation method according to claim 13 wherein the selected motion-vector set comprises:

a first motion vector pointing from a coordinate of the specified block to a first specified coordinate where the first candidate block is defined;

a second motion vector being in parallel to the first motion vector and pointing from the first specified coordinate of the first candidate block to a second specified coordinate where the second candidate block is defined; and a third motion vector being opposite to the first motion vector and pointing from the first specified coordinate of the first candidate block to a second specified coordinate where the second candidate block is defined.

17. The motion estimation method according to claim 13 wherein the selected motion-vector set is determined to be optimal if a sum of the first, second and third block difference values is smaller than any other corresponding sum resulting from another motion-vector set.

18. The motion estimation method according to claim 13 wherein the first block difference value is obtained by summing absolute values of pixel-value differences between the existing pixels of the specified block and corresponding pixels of the first candidate block; and the second block difference value is obtained by summing absolute values of pixel-value differences between the existing pixels of the specified block and corresponding pixels of the second candidate block.

19. The motion estimation method according to claim 18 wherein the corresponding pixels of the first candidate block and the second candidate block are existing pixels.

20. The motion estimation method according to claim 18 wherein the corresponding pixels of the first candidate block and the second candidate block are missing pixels filled with estimated pixel values.

21. A motion estimation method for use in a de-interlacing process, comprising:

receiving a first interlaced field, a second interlaced field and a third interlaced field of a video signal;

defining a specified block in the second interlaced field;

defining a plurality of pairs of first and second candidate blocks in the first and third interlaced fields, respectively, according to the specified block and a plurality of motion vector sets;

calculating a plurality of first block difference values between existing pixels of the specified block and corresponding pixels of the first candidate blocks;

calculating a plurality of second block difference values between existing pixels of the specified block and corresponding pixels of the second candidate blocks;

calculating a plurality of third block difference values between existing pixels of the pairs of first and second candidate blocks;

determining a provisionally optimal motion vector according to the first, second and third block difference values;

comparing one of the first block difference values, one of the second block difference values and one of the third block difference values, which correspond to the provisionally optimal motion vector, with a first threshold and a second threshold lower than the first threshold; and determining whether the provisionally optimal motion vector set includes an optimal motion vector or not according to the comparing result.

22. The motion estimation method according to claim 21 wherein the provisionally optimal motion vector set is determined to include the optimal motion vector if a first condition is not complied with that both of the second and third block difference values are greater than the first threshold and the first block difference value is smaller than the second threshold, and a second condition is not complied with that both of the first and third block difference values are greater than the first threshold and the second block difference value is smaller than the second threshold.

23. The motion estimation method according to claim 21 wherein the provisionally optimal motion vector set is determined to not include the optimal motion vector set if either a first condition is complied with that both of the second and third block difference values are greater than the first threshold and the first block difference value is smaller than the second threshold, or a second condition is complied with that both of the first and third block difference values are greater than the first threshold and the second block difference value is smaller than the second threshold.

24. The motion estimation method according to claim 23 wherein the optimal motion vector is determined solely according to the first block difference value if the first condition is complied with.

25. The motion estimation method according to claim 24 further comprising:
- calculating a plurality of motion estimation values corresponding to a plurality of preset motion vectors, respectively;
- comparing the plurality of motion estimation values to find the smallest motion estimation value; and
- determining a motion vector resulting in the smallest motion estimation value as the optimal motion vector.

26. The motion estimation method according to claim 23 wherein the optimal motion vector is determined solely according to the second block difference value if the second condition is complied with.

27. The motion estimation method according to claim 26 further comprising:
- calculating a plurality of motion estimation values corresponding to a plurality of preset motion vectors, respectively;
- comparing the plurality of motion estimation values to find the smallest motion estimation value; and
- determining a motion vector resulting in the smallest motion estimation value as the optimal motion vector.

* * * * *